United States Patent [19]

Lukkarila

[11] 4,006,474
[45] Feb. 1, 1977

[54] VIDEO GAME REBOUND APPARATUS

[75] Inventor: Jeffrey Reed Lukkarila, Fort Wayne, Ind.

[73] Assignee: The Magnavox Company, Fort Wayne, Ind.

[22] Filed: Mar. 18, 1976

[21] Appl. No.: 668,108

[52] U.S. Cl. .............. 340/324 AD; 273/DIG. 28; 358/93

[51] Int. Cl.² ........................................ H04N 7/02

[58] Field of Search ............ 340/324 A, 324 AD; 315/387, 388, 409, 410; 178/6.8, 7.5 D; 273/DIG. 28

[56] References Cited

UNITED STATES PATENTS

| 2,085,409 | 6/1937 | Bedford | 315/387 |
|---|---|---|---|
| 3,497,760 | 2/1970 | Kiesling | 178/7.5 D |
| 3,659,284 | 4/1972 | Rusch | 340/324 A |
| 3,659,285 | 4/1972 | Baer et al. | 340/324 A |
| 3,838,312 | 9/1974 | Jordan | 315/387 |

OTHER PUBLICATIONS

Larry Steckler, "TV Games at Home," Radio–Electronics, Dec. 1975, pp. 29, 30, 31, 71, 90, 91.

Primary Examiner—David L. Trafton
Attorney, Agent, or Firm—Thomas A. Briody; William J. Streeter; George R. Pettit

[57] ABSTRACT

Apparatus is described for implementing rebound circuitry in a video game simulating hockey or the like. Means are provided to detect presence of a game object at an upper or lower boundary. Further means are provided to act in response of said detection for moving the game object marker away from the boundary. The rebounding game object diminishes in velocity for a predetermined time after incidence with a boundary.

11 Claims, 2 Drawing Figures

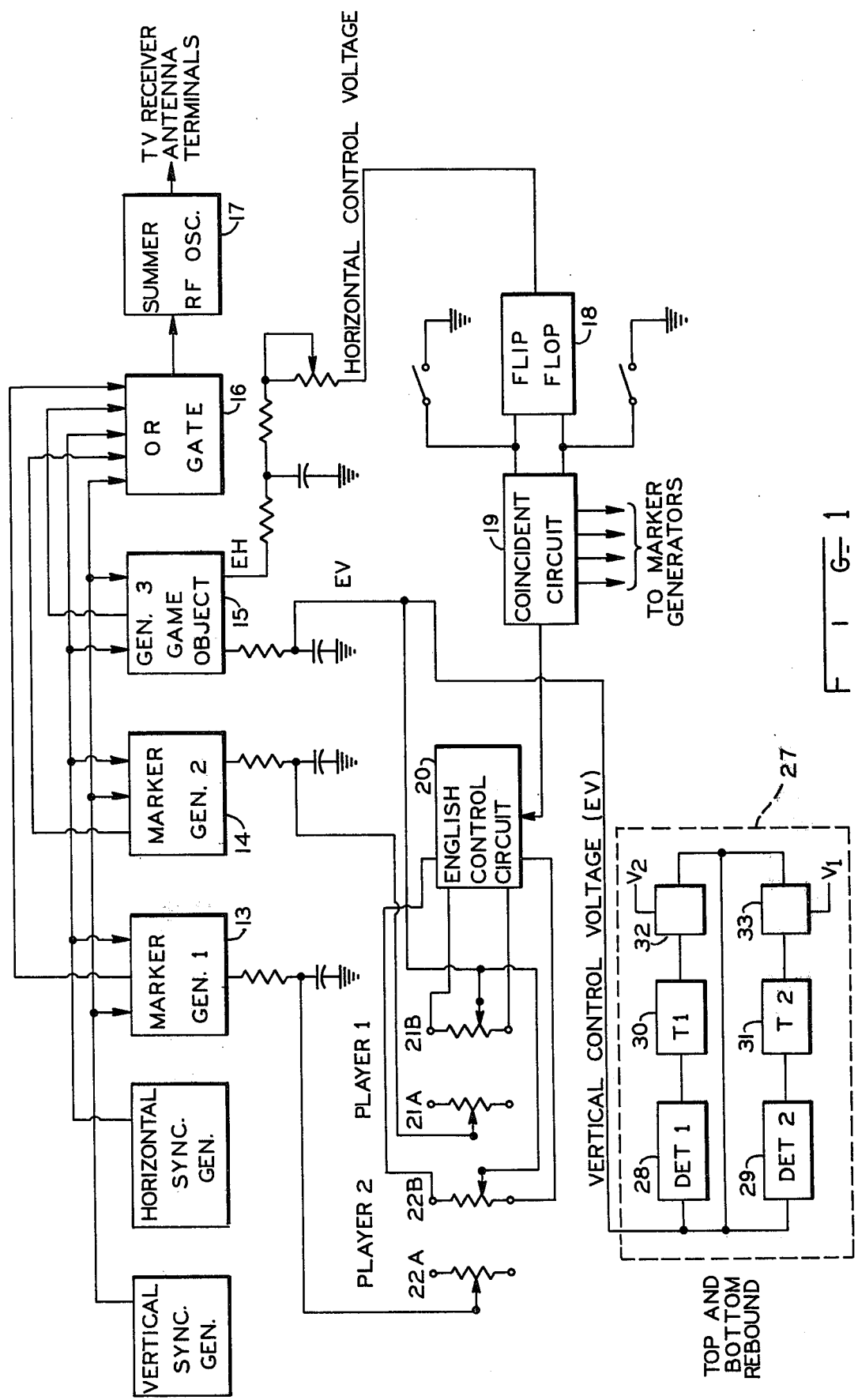

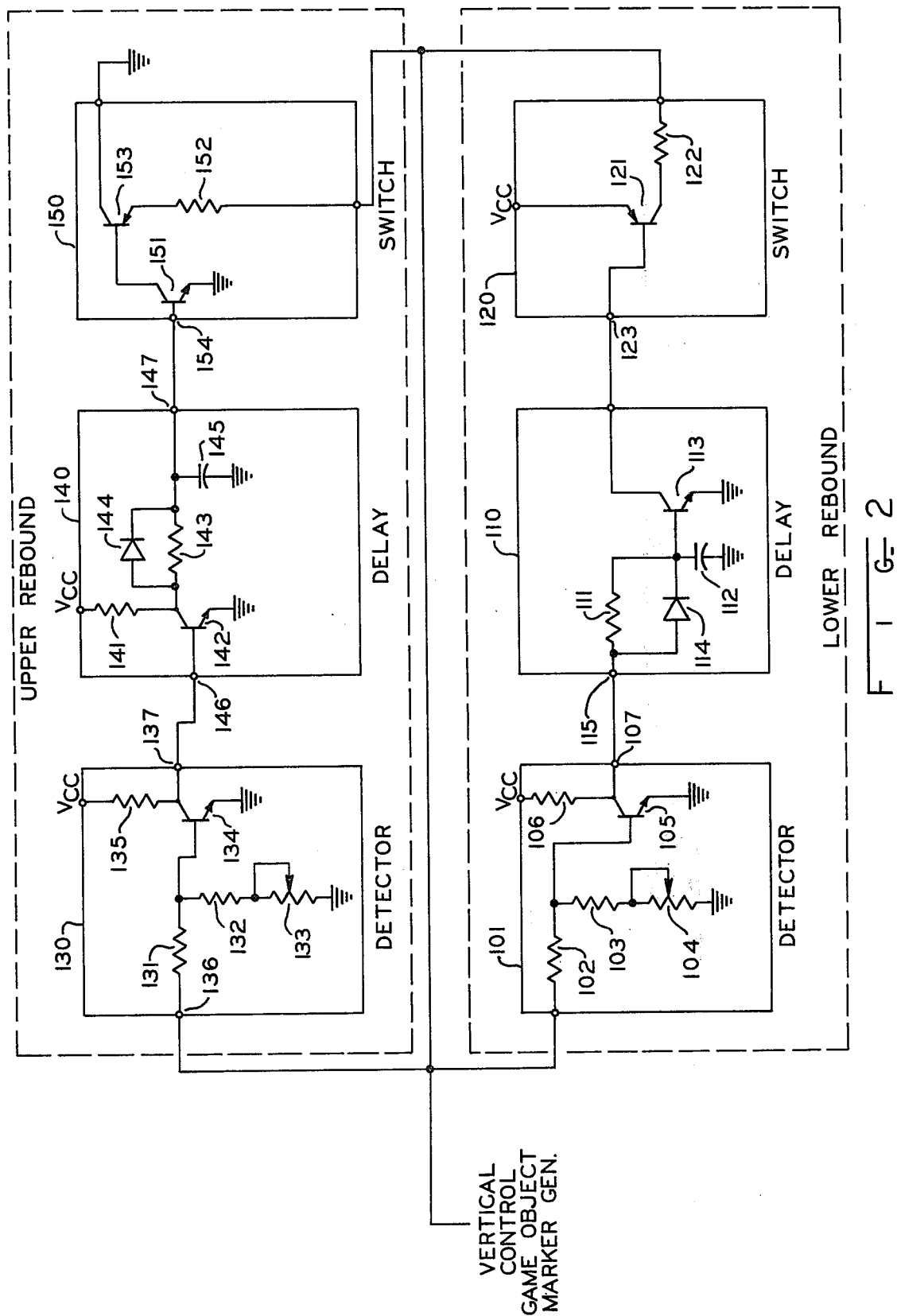

VIDEO GAME REBOUND APPARATUS

BACKGROUND OF THE INVENTION

This invention relates to the video game art. Specifically apparatus for providing a top and bottom rebound function in a game which simulates hockey, tennis, handball or the like is provided.

Electronic games which generate signals to be used in conjunction with a television receiver are well known in the art and are described in U.S. Pat. Nos. 3,659,284 and 3,659,285. The electronic game apparatus described by these references provides for an electronically simulated playing field, players, and game object to be displayed on a home television receiver. Operator controls are provided which allow player participants to manipulate spots on the screen of the television receiver to simulate field position and/or game objects. In one well-known game, a game object moves horizontally across the screen of the television receiver and each participant attempts to intercept the game object as it enters the participant's side of the playing field. When a participant successfully brings a game marker into contact with a moving target, the target reverses direction and it is an object of the game for the remaining participant to intercept the object as it enters the other side of the playing field. In this way, tennis or ping-pong may be simulated on a home television receiver.

In the aforementioned references, a simulated hockey game which is played on a television receiver screen is described. Such a game requires rebound circuitry so that the game object marker, simulating a puck, would rebound when striking either the upper or the lower boundaries on the television receiver screen. The aforementioned references describe rebound circuitry which operates by detecting the presence of the game object marker at an upper and lower boundary marker. When this detection is realized, the polarity of the target generator vertical control voltage is reversed, forcing the game object marker to move away from the boundary. The game object marker continues at the same velocity after rebounding as was attained during incidence.

SUMMARY OF THE INVENTION

It is an object of this invention to provide in a video game apparatus which simulate a hockey game or handball game circuitry for realistically simulating a rebounding hockey puck or ball.

In accordance with the invention an apparatus is described which when incorporated in an electronic video game will provide top and bottom rebound functions in a simulated hockey or handball game. Circuitry is provided to detect the presence of the game object marker (simulating a hockey puck) located at either the upper boundary surface or the lower boundary surface on the television screen. When this condition is detected, a switching means is enabled which supplies a voltage for changing the vertical direction of travel of the game object marker. Once the game object marker reverses direction, a delay means holds the switching means into continuous operation for a specified time period causing the marker to move from the boundary at a diminishing velocity. After this time period has elapsed, the game object marker is in the field of play and its vertical position is determined exclusively by the players. In this way, the rebound circuitry more closely simulates a rebounding hockey puck. The specific circuitry necessary to implement one embodiment of the invention may be determined by reference to the accompanying figures.

DESCRIPTION OF THE DRAWINGS

FIG. 1 is a partial block diagram illustrating specific game apparatus having top and bottom rebound circuitry of this invention implemented.

FIG. 2 is a schematic drawing illustrating specific circuitry for accomplishing the top and bottom rebound circuitry shown in FIG. 1.

DESCRIPTION OF THE PREFERRED EMBODIMENT

Referring now to FIG. 1, an apparatus employing an embodiment of this invention is shown. A partial block diagram of video game apparatus more particularly described in U.S. Pat. No 3,659,285, is shown with top and bottom rebound circuitry of this invention. Marker generators 13, 14 provide pulses to OR gate 16 supplies these pulses to RF oscillator-summer 17. These pulses are fed to television receiver antenna terminals to produce player markers on the screen of the TV receiver. The vertical positions of the player markers displayed on the screen are controlled by player controls 21a and 22a. By adjusting these controls, the markers will be made to move in the vertical direction on the television screen. Marker generator 15 supplies game object marker pulses to OR gate 16. The game object marker pulses are thereafter supplied to the summer RF oscillator 17 where they are transmitted to a television receiver and appear as an object moving across the television screen. The position of the game object marker is controlled by a vertical control voltage EV and a horizontal control voltage EH. When a player successfully moves a player marker into coincidence with the game object marker, a coincidence detector 19 causes flip flop 18 to change state. The change of state of flip flop 18 causes the horizontal direction of the game object marker to change. Control of the vertical position of the game object marker is transferred through an "English" control circuit 20. The English control circuit 10 enables either control 21b or control 22b. The player who successfully intercepts the game object marker may, by varying control 21b or 22b, alter the vertical position of the game object marker.

When a game object marker comes into contact with the upper or lower boundary the game object marker will be directed from the boundary by the top and bottom rebound circuitry 27 enclosed within the broken line box of FIG. 1. The top and bottom rebound circuitry provides a decaying signal for combining with the English control signal. The decaying signal has a magnitude and polarity which causes the game object marker to move away from the boundary at a decreasing velocity. When a predetermined time has elapsed, the rebound circuit output signal is reduced to zero.

The top and bottom rebound circuitry 27 consists of a first detector 28, a second detector 29, two time delay means 30, 31, and two switching means, 32, 33. The first detector circuit 28 provides an output signal when an input signal EV, the vertical control voltage of the game object marker generator, indicates that the marker is substantially at the upper boundary. When this condition is detected, a switching means 32 is enabled. Switching means 32, when enabled, connects a voltage source V$_2$ to the vertical control input of the game object marker generator 15. $V_2$ will force the game object marker to move from the upper boundary towards the lower boundary. A delay means 30 provides for continuous enabling of switching means 32 for a time period sufficient to move the game object marker a sufficient distance from the boundary marker. The switching means-delay means combination causes the vertical control voltage EV to change at a nonlinear rate so that the marker vertical velocity decreases with time. This effect results from the impedance of the switching means increasing as the enabling voltage from the delay means decreases and after the lapse of the predetermined time delay, complete English control is returned to the player participants of the game.

The bottom rebound circuitry operates in a manner similar to the top rebound circuitry. The bottom rebound circuitry comprises a detector 29, delay means 31, and switching means 33. The detector 29 provides an output signal when the game object marker is substantially at the bottom boundary. This signal enables a switching means 33 which connects a voltage $V_1$ to the vertical control voltage input of the game object marker generator 15. $V_1$ is at such a potential to cause the game object marker to move away from the bottom boundary. A time delay circuit 31 provides continuous enabling of switching means 33 for a predetermined time after the game object marker has moved away from the bottom boundary. Once enabled, the impedance of the switching means 33 increases with time because of the decreasing enabling voltage from delay circuit 31 causing the marker vertical velocity to decrease with time. When the switching means 33 is finally disabled, vertical position of the game object marker is determined entirely by the appropriate player English control.

Referring now to FIG. 2, detailed circuitry is shown for accomplishing the top and bottom rebound circuit 27 of Fig. 1. The upper rebound portion of the circuit described by FIG. 2 comprises a voltage detector 130, a delay means 140, and a switching means 150. The input of the voltage detector 130 is connected to the vertical control input of the game marker generator. When the game object marker is substantially at the upper boundary, voltage detector 130 provides a low voltage (approximately 0.2 volts) to the input of the delay means 140.

The voltage detector 130 operates in the following manner. A voltage divider network consisting of resistor 131, 132, and potentiometer 133 divides the vertical control voltage. The resulting voltage is applied to the base of transistor 134. The collector of transistor 134 is connected through a resistor 135 to a source of d.c. potential Vcc. The combination of resistors 131, 132, and potentiometer 133 is such that when the game object marker is at the upper boundary, transistor 134 is turned on. The turn-on of transistor 134 results in terminal 137 being at a potential of approximately 0.2 volts.

The detection of the game object marker by detector 130 is used to enable the switching means 150. The delay means 140 directly couples a d.c. voltage through resistor 141 and diode 144 to the input of the switching means 150 when terminal 137 of the voltage detector 130 is at 0.2 volts.

Terminal 137 of voltage detector 130 is directly connected to the input terminal 146 of delay means 140. The input of the delay circuit 146 is directly connected to the base of a transistor 142. The collector of the transistor is connected to a source of d.c. voltage Vcc through a resistor 141. The collector of the transistor 142 is also directly connected to one end of the parallel combination of a diode 144 and resistor 143. The remaining end of the parallel combination of the diode 144 and resistor 143 is connected to one end of a capacitor 145. This end of the capacitor 145 is further connected to the output terminal 147 of the delay circuit 140. The remaining end of capacitor 145 is connected to ground.

The operation of this circuit 140 is such that when terminal 146 is lowered to a potential of 0.5 volts or less, the transistor 142 is turned off and a d.c. voltage is directly coupled from the collector of transistor 142 through diode 144 to the output terminal 147 of the delay network. When the input voltage to the delay circuit 140 rises above 0.7 volts, indicating that the game object marker has moved away from the boundary, the capacitor 145 and resistor 143 combination maintains for a limited time a voltage at terminal 147. The voltage presented at terminal 147 decreases with time while at the same time enabling switching means 150. The decrease with time of the voltage presented at terminal 147 will cause the game object marker vertical velocity to decrease as it moves away from the boundary. When a predetermined time has elapsed, switching means 150 will be disabled and vertical control over the game object will be determined entirely by the appropriate player participant.

The switching means 150 reduces the voltage at the vertical control input of the game object marker generator. By reducing the voltage at the control input, the game object marker is forced to move away from the boundary.

The switching means 150 operates in the following manner. A transistor 151 having a base terminal connected to the input terminal 154 has its collector terminal connected to the base of another transistor 153. The emitter of transistor 153 is connected through a resistor 152 to the vertical control input of the game object marker generator. When the delay means 140 supplies a signal indicative of a game object marker in coincidence with the boundary, transistor 151 is rapidly turned on. This turn-on produces conduction in transistor 153 so that the vertical control input of the game object marker generator is rapidly connected to a source of low potential through a resistor 152, causing the object marker to "rebound" at an initial velocity. The voltage at the input to the switching means 150 then decreases as determined by capacitor 145 and resistor 143, causing the impedance of transistor 153 to increase accordingly. This results in a reduction of the object marker vertical velocity with time.

The lower rebound circuitry operates in a manner similar to the upper rebound circuitry. A voltage detector 101 is used to determine when the game object marker is near the lower boundary. When the game object marker approaches a lower boundary, the voltage output terminal 107 of the voltage detector switches from a low potential of 0.2 volts to a higher potential. The operation of this circuit is as follows.

Two resistors 102 and 103 in combination with a potentiometer 104 divide the vertical control input voltage of the marker generator. The resulting voltage is applied to the base of transistor 105. The collector of transistor 105 is connected through a resistor 106 to a supply of d.c. voltage. When the game marker approaches the lower boundary, the transistor 105 turns off as the voltage divider does not provide sufficient voltage to saturate the base emitter junction of transistor 105. This change in voltage at the collector of transistor 105 is directly coupled to the input 115 of the delay circuit 110.

The delay circuit 110 supplies a potential for activating a switching means 120. When the delay means 110 receives the high voltage input from the voltage detector 101, a low voltage is presented to the input 123 of switching means 120. The delay circuit operates so as to provide an enabling signal to switching means 120 when the game object marker is detected in coincidence with the lower boundary. As the game object marker moves away from the lower boundary, the delay circuit 110 provides further enabling of switching means 120.

The operation of delay means 110 may be described as follows. The high voltage signal is received from the detector circuit 101 through a resistor 111 in parallel with diode 114. The remaining end of the parallel combination of the diode 114 and resistor 111 is connected to a base of a transistor 113. Connected also to the base of transistor 113 is one end of a capacitor 112. The remaining end of capacitor 112 is grounded. The collector of transistor 113 provides the output of the delay means. When the high voltage signal is received from delay means 101 it is directly coupled to capacitor 112 and to the base of transistor 113 through the diode 114. The result is that capacitor 112 is rapidly charged and transistor 113 is turned on. The turn-on of transistor 113 supplies a low potential to the input of the switching means 120. When the game object marker begins to move away from the lower boundary, the capacitor 112 in combination with the resistor 111 provides continuing enabling for the switching means 120 for a predetermined time. As the potential on the capacitor 112 decreases, conduction through transistor 113 decreases until a substantially open circuit is provided to the input of switching means 120. The enabling voltage produced by transistor 113 accordingly diminishes with time.

The switching means 120 operates to provide a d.c. voltage to the vertical control input of the game object marker generator which will force the game object marker to move away from the lower boundary. The switching means 120 comprises a transistor 121 having its emitter connected to a source of d.c. potential Vcc and its collector connected to one end of a resistor 122. When the input 123 of the switching means 120 is connected to a source of low voltage potential, a voltage Vcc is provided through resistor 122 to the game object control input for forcing the game object marker away from the lower boundary at an initial "rebound" velocity. The vertical velocity of the marker will decrease as in the case of the top rebound circuit because of a reduction in enabling voltage to the switching means.

Thus there has been described specific circuitry for implementing the invention in a video game apparatus. Those skilled in the art will recognize other circuitry for implementing the voltage detectors, delay circuits and switching means of the invention described more particularly by the claims that follow.

What is claimed is:

1. Apparatus for providing a rebound function in a video game comprising means for detecting the presence of a game object marker near a boundary; and means for forcing said game object marker to move away from said boundary with a diminishing velocity when said game object marker is coincident with said boundary marker.

2. An apparatus for providing a rebound function in an electronic video game comprising:
    a. voltage detection means, said means producing an enabling signal when a game object marker is coincident with a boundary;
    b. switching means for connecting a d.c. voltage source to a marker generator position control input, said means being responsive to said voltage detection means enabling signal, said d.c. voltage source having a polarity and magnitude so as to cause said game object marker to move away from said boundary; and
    c. delay means for continuously enabling said switching means for a predetermined time after said game object marker moves away from said boundary.

3. The apparatus of claim 2 wherein said switching means has an impedance determined by the magnitude of said enabling voltage.

4. The apparatus of claim 3 wherein said enabling voltage changes with time.

5. The apparatus of claim 2 wherein said voltage detection means comprises:
    a. a transistor having a base, emitter and collector;
    b. a first resistor connected to said transistor base;
    c. a second resistor having a first end connected to said transistor base;
    d. a potentiometer, said potentiometer having a first end terminal, second end terminal, and a wiper terminal, said first end terminal and said wiper terminal being connected to a second end of said second resistor, and second end terminal of said potentiometer being connected to said transistor emitter; and
    e. a resistor having one end connected to said transistor collector, and a second end connected to a source of d.c. voltage.

6. An apparatus for providing a rebound function in an electronic video game comprising:
    a. voltage detection means, said means having an output signal when a game object marker is coincident with a boundary;
    b. switching means for connecting a game object marker generator control input to ground potential in response to said voltage detection means output signal; and
    c. delay means for continuously enabling said switching means for a predetermined time after said switching means is enabled by said voltage detection means output signal.

7. An apparatus for providing a top and bottom rebound function in a video game comprising:
    a. a first voltage detection means, said means having an output signal when a game object marker is coincident with an upper boundary;
    b. a second voltage detection means, said means having an output signal when a game object marker is coincident with a lower boundary;
    c. a first switching means for connecting a vertical control input of the game object marker generator to ground potential, said first switching means being responsive to said first voltage detection means output signal;
    d. a first delay means for continuously enabling said switching means for a predetermined time after said first voltage detection means produces an output signal;

e. a second voltage detection means, said second voltage detection means having an output signal when a game marker is in coincidence with a lower boundary;

f. a second switching means for connecting a vertical control input of the game object marker generator to a source of d.c. potential, said second switching means being responsive to said second voltage detection means output signal; and g. a second delay means for continuously enabling said second switching means for a predetermined time after said second voltage detection means produces an output signal.

8. The apparatus of claim 6 wherein said switching means has an impedance determined by the magnitude of said output signal.

9. The apparatus of claim 8 wherein said output signal changes with time.

10. The apparatus of claim 6 wherein said switching means comprises:

a. an NPN transistor having a base, emitter, and collector; said emitter being connected to ground potential; said base being operatively connected to said voltage detection means;

b. a PNP transistor having a base, collector, and emitter; said collector being connected to ground potential, and said base being connected to said NPN transistor collector; and c. a resistor, said resistor having one end connected to said PNP transistor emitter and the remaining end of said resistor being connected to said game object marker generator.

11. The apparatus of claim 4 wherein said switching means comprises a transistor and a resistor; said transistor having a base operatively connected to said voltage detection means, an emitter connected to a source of d.c. potential, and a collector connected to one end of said resistor, the remaining end of said resistor being operatively connected to said marker generator position control input.

* * * * *